US011546056B2

United States Patent
Ooi et al.

(10) Patent No.: US 11,546,056 B2
(45) Date of Patent: Jan. 3, 2023

(54) ACROSS WATER-AIR INTERFACE COMMUNICATION METHOD AND SYSTEM

(71) Applicant: KING ABDULLAH UNIVERSITY OF SCIENCE AND TECHNOLOGY, Thuwal (SA)

(72) Inventors: Boon Siew Ooi, Thuwal (SA); Xiaobin Sun, Thuwal (SA); Chao Shen, Thuwal (SA); Tien Khee Ng, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/431,465

(22) PCT Filed: May 7, 2019

(86) PCT No.: PCT/IB2019/053747
§ 371 (c)(1),
(2) Date: Aug. 17, 2021

(87) PCT Pub. No.: WO2020/201818
PCT Pub. Date: Oct. 8, 2020

(65) Prior Publication Data
US 2022/0140903 A1    May 5, 2022

Related U.S. Application Data

(60) Provisional application No. 62/828,012, filed on Apr. 2, 2019.

(51) Int. Cl.
*H04B 10/112* (2013.01)
*H04B 10/118* (2013.01)
*H04B 13/02* (2006.01)

(52) U.S. Cl.
CPC ....... *H04B 10/1129* (2013.01); *H04B 10/118* (2013.01); *H04B 13/02* (2013.01)

(58) Field of Classification Search
None
See application file for complete search history.

(56) References Cited

U.S. PATENT DOCUMENTS

| 4,493,114 A | 1/1985 | Geller et al. |
| 5,038,406 A | 8/1991 | Titterton et al. |
| (Continued) | | |

FOREIGN PATENT DOCUMENTS

| CN | 108833022 A * | 11/2018 | ............ G01S 17/08 |
| WO | WO-2008027072 A2 * | 3/2008 | ............ H04B 13/02 |

OTHER PUBLICATIONS

Kaushal, "Underwater Optical Wireless Communication", Apr. 29, 2016, IEEE Access, vol. 4, Digital Object Identifier 10.1109/ACCESS.2016.2552538, pp. 1518-1547 (Year: 2016).*

(Continued)

*Primary Examiner* — David W Lambert
(74) *Attorney, Agent, or Firm* — Patent Portfolio Builders PLLC

(57) ABSTRACT

A method for transmitting information across a water-air interface with a ultraviolet (UV) beam, the method including emitting the UV beam in a first medium, with a first optical wireless communication device; measuring a scintillation index of the UV beam in a second medium, different from the first medium, at a second optical wireless communication device; selecting, based on a value of the scintillation index, a modulation scheme for the UV beam; and modulating the UV beam with the selected modulation scheme. The UV beam has a wavelength in a range of 100 to 400 nm.

19 Claims, 14 Drawing Sheets

(56) References Cited

U.S. PATENT DOCUMENTS

| | | | |
|---|---|---|---|
| 7,953,326 | B2 | 5/2011 | Farr et al. |
| 8,436,747 | B2 | 5/2013 | Schoepp |
| 9,871,589 | B2 | 1/2018 | Breuer et al. |
| 2007/0253713 | A1 | 11/2007 | Reilly et al. |
| 2015/0245448 | A1* | 8/2015 | Readier ............ G08C 23/00 398/106 |
| 2017/0018174 | A1* | 1/2017 | Gerszberg ............ H04B 10/112 |
| 2018/0241475 | A1 | 8/2018 | Lu et al. |

OTHER PUBLICATIONS

PCT International Search Report (Forms PCT/ISA/220 and PCT/ISA/210) for corresponding/related International Application No. PCT/IB2019/053747, dated Dec. 18, 2019.

PCT Written Opinion of the International Searching Authority (Form PCT/ISA/237) for corresponding/related International Application No. PCT/IB2019/053747, dated Dec. 18, 2019.

Sun, X., et al., "375-nm ultraviolet-laser based non-line-of-sight underwater optical communication," Optics Express, vol. 26, No. 10, May 14, 2018 (Published May 4, 2018), pp. 12870-12877.

Söderberg, J., "Free Space Optics in Czech Wireless Community: Shedding Some Light on the Role of Normativity for User-Initiated Innovations," Science, Technology, & Human Values, Jul. 2011, vol. 36, No. 4, pp. 123-450, Sage Publications, Inc.

Sun, X., et al., "71-Mbit/s Ultraviolet-B LED Communication Link Based on 8-QAM-OFDM Modulation," Optice Express, Sep. 18, 2017, vol. 25, No. 19, pp. 23267-23274.

\* cited by examiner

ACROSS WATER-AIR INTERFACE COMMUNICATION METHOD AND SYSTEM

CROSS-REFERENCE TO RELATED APPLICATIONS

This application is a U.S. National Stage Application of International Application No. PCT/IB2019/053747, filed on May 7, 2019, which claims priority to U.S. Provisional Patent Application No. 62/828,012, filed on Apr. 2, 2019, entitled "A COMMUNICATION APPARATUS ACROSS WATER-AIR SURFACE AND THE METHOD MADE OF," the disclosures of which are incorporated herein by reference in their entirety.

BACKGROUND

Technical Field

Embodiments of the subject matter disclosed herein generally relate to wireless data communication across the water-air interface, and more specifically, to a communication system and method that uses an electromagnetic wave having high-scattering properties.

Discussion of the Background

With increasing underwater activities, ranging from military surveillance, research missions, and underwater pipeline monitoring, transmitting information collected underwater to a terrestrial platform, or vice versa, for analysis and utilization becomes more and more important. It is challenging to use a single carrier for such across the water-air interface communications due to the different properties of the single carrier in water and in air.

For example, the acoustic waves are favorable for underwater communications due to the long transmission distance (in the order of kms). However, the acoustic waves experience severe reflection off the water surface. The radio frequency (RF) is usually used for terrestrial wireless communications (also in the order of kms), but suffers strong attenuation in the water.

The conventional solutions for the across the water-air interface communications are illustrated in FIG. 1. FIG. 1 shows a system 100 that includes an underwater user 110 (e.g., a submarine, a data collection node, a diver, etc.), a relaying device 120 (for example, an autonomous underwater vehicle (AUVs), or a partially submerged relay) operating in water and at the water-air interface, which acts as a data mule, and above the water user 130 (for example, an aircraft, or a vessel, etc.) which is exchanging information with the first user 110. The relaying device 120 is equipped with an acoustic transceiver 122 to communicate via acoustic waves 124 with the underwater user 110. The relaying device 120 is configured to move to the water-air interface 140, and then to interact with the second user 130, over radio airwaves or optical light 126. However, such a system not only exposes the location of the underwater user 110, but also limits the underwater user's overall maneuverability because the underwater user and the relaying device need to be in the accessible range of each other.

More recent systems use only a type of signal carrier for achieving the communication between the two users 110 and 130. For example, one such system uses extremely-low frequency radio waves, known as the Project Sanguine, a second system uses a very-low frequency (VLF), known as TACAMO, and a third system uses HF, VHF, and UHF, which is the Navy's system known as the Submarine Satellite Information Exchange Sub-System (SSIXS). Another Navy project, the ELF system, uses an extremely-low frequency modulated carrier for communication with submerged submarines. This last system uses a large antenna (about 23 km long) to send very high-power signals (2.6 Megawatt) to the submarines. The advantages of this system are that the submerged submarines can receive ELF signals to depths of several hundred meters whether in open water or under an ice pack. However, limited by the bandwidth of the ELF, this system features extremely low-data rate (on the order of minutes per character), and it is a one-way communication since the submarines cannot be equipped with such a large antenna.

On the other hand, the VLF utilized in the TACAMO system is able to provide usable data rate for message traffic delivery, but a transmitting airplane must trail a long antenna to communicate over a significant ocean area. Like the ELF system, the VLF system also provides only one-way communications. Due to the low-data rate provided by these methods, these systems are undesirable for tactical operations. Although the SSIXS system, which uses HF, VHF, and UHF, can provide higher data rate and transmit information via both voice and teleprinter modulation techniques, it requires that the submarines surface an antenna to communicate with the base station, and this operation may betray the location of the submarine.

An emerging technique is using two carriers, such as acoustic-RF or acoustic-optical light. This technology combines acoustic and radar signals to enable submerged submarines to communicate with airplanes and is known as the Translational Acoustic-RF (TARF) system. An underwater transmitter uses an acoustic speaker pointed toward the surface. The transmitter sends sound signals, which travel as pressure waves. When these waves hit the water surface, they cause tiny vibrations of the water surface. Above the water, a radar continuously bounces a radio signal off the water surface. When the surface vibrates slightly due to the sound signal, the radar can detect these vibrations, completing the signal's journey from the underwater speaker to an in-air receiver. A similar concept is used by the Navy in a system that combines acoustic-optical light. While these newer systems are promising, they require strict alignment between the transmitter and receiver, which results in highly complex systems, and also they have a low robustness.

Optical wireless communications have been studied as an alternative solution. An underwater wireless optical communication (UWOC) link having a data rate of 1 Mbit/s with a transmission distance of 100 m has been demonstrated by Woods Hole Oceanography Institution (WHOI) [1]. In the meantime, the Reasonable Optical Near Joint Access (RONJA) project has demonstrated a free-space optical wireless communication with a transmission distance of 1-2 km at full Ethernet speed (10 Mbit/s) [2]. Hence, it is possible to leverage the optical light to transmit the signal across the water-air surface. Though high-speed (Gbit/s) communication over a long distance (26 m) across the water-air interface, under calm water conditions, has been demonstrated by these systems, they also shows that a line-of-sight (LOS) configuration can hardly support a stable across-medium (water-air) data transmission due to the strict optical alignment requirement between the transmitter and the receiver. Furthermore, such LOS communications cannot provide a large coverage area for the mobile users because of the alignment requirements.

Another system proposed a tactical and covert two-way communication channel between an aircraft and a submarine with LOS configuration, while enlarging the coverage by using a motorized optics for scanning [3]. However, due to the limited motorized range, the scanning coverage shown in the system is extremely small (~10 nm). Therefore, there is a need for an across the water-air interface communication link with large coverage for practical applications.

SUMMARY

According to an embodiment, there is a method for transmitting information across a water-air interface with a ultraviolet (UV) beam, the method including emitting the UV beam in a first medium, with a first optical wireless communication device; measuring a scintillation index of the UV beam in a second medium, different from the first medium, at a second optical wireless communication device; selecting, based on a value of the scintillation index, a modulation scheme for the UV beam; and modulating the UV beam with the selected modulation scheme. The UV beam has a wavelength in a range of 100 to 400 nm.

According to another embodiment, there is a method for transmitting information across a water-air interface with a ultraviolet (UV) beam, the method including emitting the UV beam in a first medium, with a first optical wireless communication device, estimating a height of a water wave at the water-air interface, with a second optical wireless communication device that is located in a second medium, different from the first medium, selecting, based on a value of the height of the water wave, a modulation scheme for the UV beam, and modulating the UV beam with the selected modulation scheme. The UV beam has a wavelength in a range of 100 to 400 nm, and the first medium is air or water and the second medium is water or air, respectively.

According to still another embodiment, there is a system for transmitting information across a water-air interface with a ultraviolet (UV) beam. The system includes a first optical wireless communication device configured to emit in water the UV beam, a second optical wireless communication device configured to measure a parameter, and a controller that is configured to select, based on a value of the measured parameter, a modulation scheme for the UV beam. The first optical wireless communication device modulates the UV beam with the selected modulation scheme, and the UV beam has a wavelength in a range of 100 to 400 nm.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
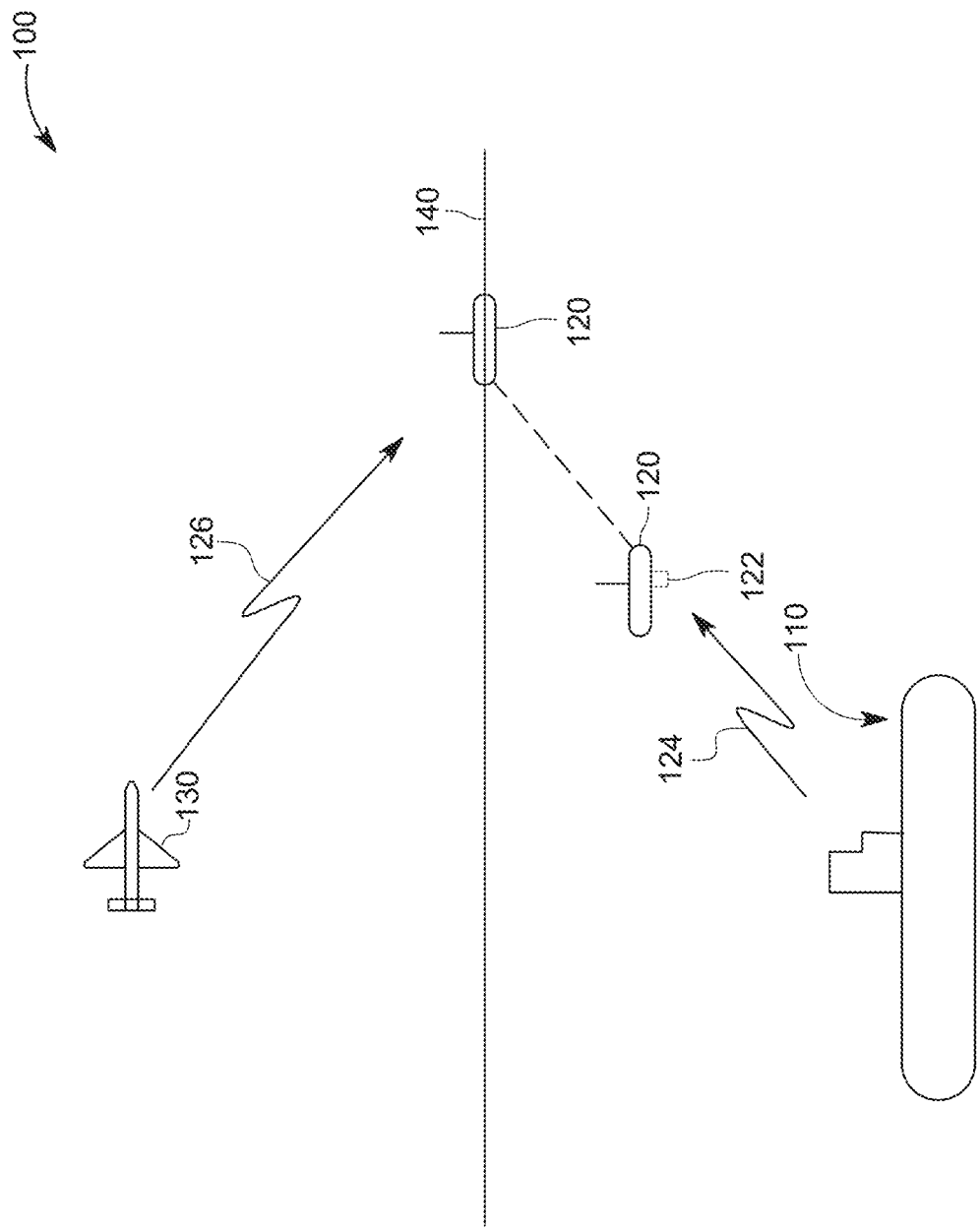
FIG. 1 is a schematic illustration of an underwater device in communication with an over the water device.

The following description of the embodiments refers to the accompanying drawings. The same reference numbers in different drawings identify the same or similar elements. The following detailed description does not limit the invention. Instead, the scope of the invention is defined by the appended claims. For simplicity, the following embodiments are discussed with regard to transmitting information from water into air and vice versa. However, the methods and systems discussed herein are equally applicable to transmitting information from a first medium to a second medium, wherein the first medium is a liquid and the second medium is a gas.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is an optical wireless communication system that has one or more ultraviolet (UV) light emitter, controllable divergent optics, UV photodetector, bandpass optical filter, and a signal processor that together are capable to exchange information across a water-air interface using a single type of carrier, i.e., a UV beam. The system is configured to measure a scintillation coefficient of the UV beam or a height of a water wave and select an appropriate modulation scheme for the UV beam. The system provides robust, large coverage, high data rate, bi-directional communications between a submerged device and an above the water device. The above the water device may be an aircraft that travels in air.

In one application, the optical wireless communication system is configured to adaptively change a modulation schemes based on a scintillation condition or a disturbance of the water-air interface, dependent on the location of the receiver. The system may switch to on-off-keying (OOK) modulation for low scintillation or low signal-to-noise (SNR) conditions and switch to orthogonal-frequency-division-multiplexing (OFDM) modulation for high scintillation or high SNR environment.

The communication link established using the optical wireless communication system can be line-of-sight, diffused line-of-sight or none-line-of-sight. In one application, the UV light emitter of the optical wireless communication apparatus might be a light-emitting diode, superluminescence diode, or laser diode. The UV light emitter may be configured to emit a wavelength in the range from 200 nm to 400 nm, and the UV light emitter might be a UV-C, UV-B or UV-A source. In still another application, the light emitter may have an optical power greater than 10 mW, greater than 100 mW, greater than 1 W, or greater than 10 W. In yet another application, the controllable divergent optics has a small absorption in the UV bands (e.g., larger than 70% transmittance). In one application, the highly sensitive UV photodetectors should have a sensitivity larger than $10^2$ NW, larger than $10^3$ NW, larger than $10^4$ NW, or larger than $10^5$ A/W. The UV photodetectors may include, but are not limited to, photomultiplier tubes (PMT), avalanche photodetector (APD). The UV bandpass optical filter has a very narrow band that has a spectral linewidth smaller than 10 nm, or smaller than 5 nm. The data-rate for this system is greater than 1 Mbit/s, greater than 10 Mbit/s, or greater than 100 Mbit/s.

The optical wireless communication system is now discussed in more detail. The inventors have observed that UV light is characterized by high-scattering properties (i.e., the photons of the UV light are scattered by the particles in the water/air, thus changing the traveling direction of the photons), which make feasible to build a diffuse-LOS [4] or non-line-of-sight (NLOS) [5], [6] wireless communication link, both in free-space and underwater. Therefore, if the UV light is used, the across water-air interface for diffuse-LOS/NLOS communication links can be enlarged, which makes easier the direct communication between the transmitter and the receiver. In addition, there is a low-background solar radiation and low device dark noise for the UV-band (100-400 nm), especially for the UV-C/B bands (100-280 nm/280-315 nm).

Figure 2:
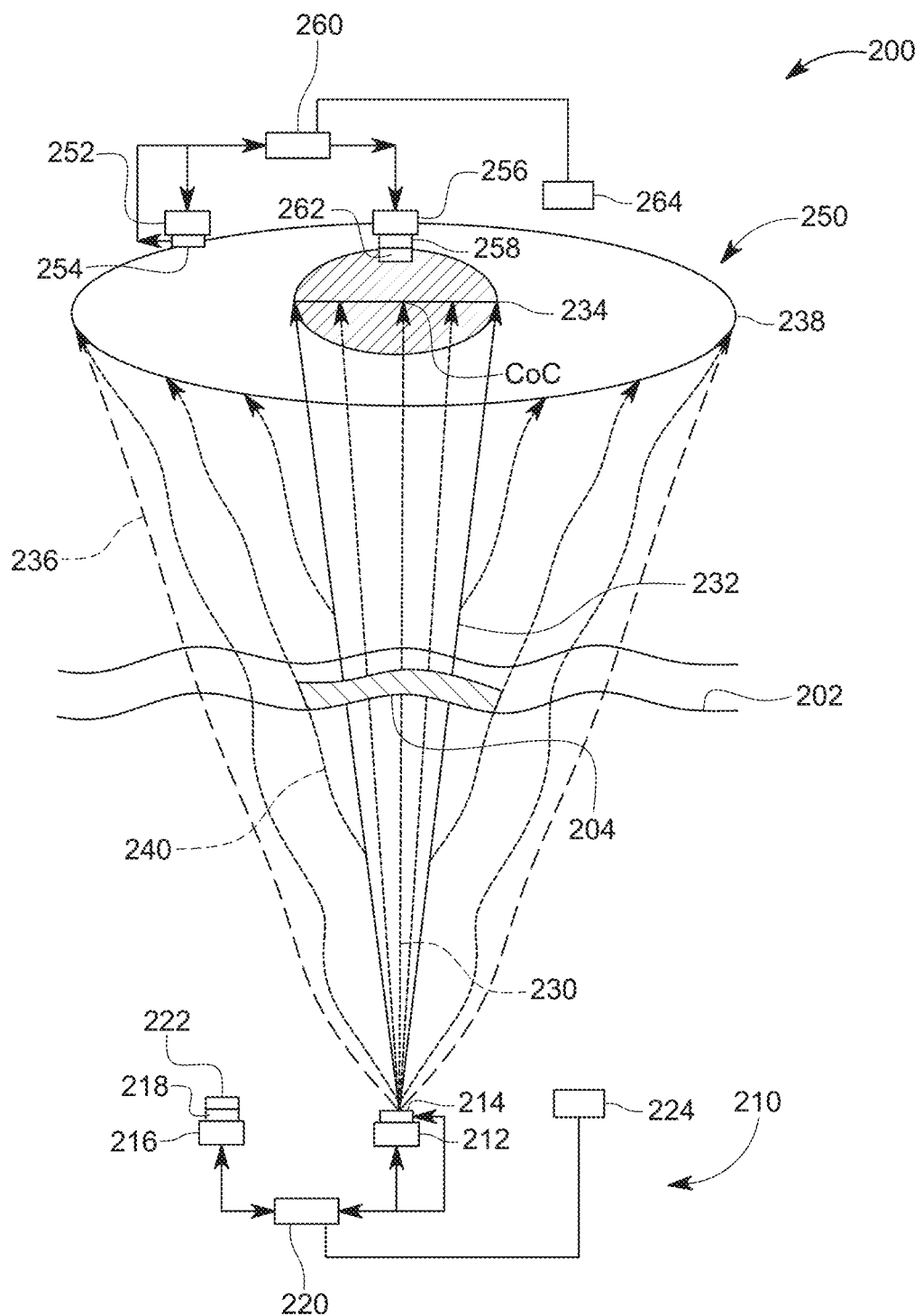
FIG. 2 is a schematic illustration of a system that uses optical light for achieving wireless communication from a fluid medium to a gaseous medium.

Thus, based on these observations, an optical wireless communication system 200 that is capable to exchange data over a water-air interface by using a single type of carrier (i.e., only UV light) includes a first optical wireless communication device 210, which is located below the water-air interface 202 (i.e., underwater), and a second optical wireless communication device 250, which is located above the water-air interface 202, as illustrated in FIG. 2. The first optical wireless communication device 210 may be located on an underwater vehicle (e.g., submarine, AUV, buoy) that is capable of moving, or on a fixed platform, e.g., ocean bottom node that is used in seismic exploration or wellhead for offshore well. The second optical wireless communication device 250 may be placed on an airborne apparatus (e.g., drone, airplane, helicopter, rocket, hot air balloon, etc.) or on a land building (e.g., base station, vehicle, tank, control center, pole, aerial, etc.).

The optical wireless communication device 210 includes a UV transmitter 212 and associated projection optics 214, and a UV receiver 216 and associated collection optics 218. An operator terminal and coordinator (called herein a controller) 220 is in communication with each of these elements. The UV transmitter 212 may be a laser device or LED or diode that is configured to generate UV light in the UV-A or UV-B or UV-C band. A waveform generator (not shown) may be part of the controller 220 and may be used to generate a desired waveform that is then applied to the UV transmitter 212 for emitting the UV beam 230. The projection optics 214 may include one or more lenses for making the UV beam 230 more convergent or divergent. In this embodiment, the projection optics 214 is used to make the UV beam 230 more divergent for reasons to be discussed later.

The UV receiver 216 may be a photodetector that is configured to receive and record UV light. Associated collection optics 218 may be used with the UV receiver 216 for converging the incoming UV light beam (not shown) onto the receiver. Each of these elements is controlled by the controller 220. The controller 220 may include at least a processor and a memory, but may also include the waveform generator, and other electronics (e.g., a bias Tee) for controlling the transmitters and emitters and/or for partially processing the signals.

In one embodiment, the first optical wireless communication device 210 may also include a wave measuring device 224 for determining a status of the water-air interface 204, i.e., a height of the water waves at the water surface 202. Such a measuring device may be an acoustic device.

The second optical wireless communication device 250 may have a similar structure as the first optical wireless communication device 210. However, the wave measuring device 264 is a laser device in this case, which is also used to measure the height of the water waves at the water-air interface. Note that the second optical wireless communication device 250 is located in air, above the water-air interface 204. The second optical wireless communication device 250 includes a UV receiver 256 that has associated optics 258 for converging the incoming UV light beam 230. The second optical wireless communication device 250 also has a UV transmitter 252 and associated optics 254 for diverging an emitted UV beam (not shown). A controller 260 is connected to each of these elements and is configured to instruct the UV transmitter to transmit a UV beam and the UV receiver to record the UV beam 230. Also, the controller 260 receive information from the measuring wave device 264.

The UV light beam 230 propagates from the first optical wireless communication device 210 toward the second optical wireless communication device 250. Along its traveling path, the UV light beam 230 diverges, as shown by the first cone 232 in FIG. 2. This divergent path has a large footprint 234 when arriving at the second optical wireless communication device 250. In addition to the first cone 232, there is a second cone 236 that is generated as a result of the high-scattering properties of the UV light. In other words, the first cone 232 is a result of the intrinsic properties of any light emitting device while the second cone 236 is a result of the choice of light that is emitted, in this case UV light. FIG. 2 schematically illustrates UV rays 240 that are scattered from the first cone 232, by various particles in water and/or air and thus, they form the second cone 236. The footprint 238 of the second cone 236 is larger than the footprint 234 of the first cone 232, which is advantageous for communication purposes as the area where the second optical wireless communication device could be present for establishing the communication link with the first optical wireless communication device is much larger than for the traditional systems.

In one embodiment, the transmitter 212 is instructed by the controller 220 to send an up-link OOK-modulated and/or OFDM-modulated UV light beam 230, as shown in FIG. 2. The controller 220 may embed a predetermined identification code (IFF) into the beam 230 to identify the transmitter 212 to the second optical wireless communication device 250. The IFF code may be configured to include a friend or foe identifier. In this embodiment, the transmit optics 214 is configured to spread the beam 230 out into a circle-shaped pattern, to maximize the coverage of the search area where the second optical wireless communication device is expected to be.

Therefore, a communication link between the second optical wireless communication device 250 and the first optical wireless communication device 210 can be quickly established, regardless of the moving direction of the platforms, to which these devices are attached to (e.g., submarine for the first optical wireless communication device 210 and airborne aircraft for the second optical wireless communication device 250). When the uplink beam 230's energy is within the range of the UV detector 256 of the second optical wireless communication device 250, the UV detector 256 may be configured to filter out the ambient light, through a narrow-band filter 262, and convert the modulated light to an electrical signal. A signal processor located in the controller 260 is configured to decode the electrical signals and to verify the IFF code to prevent the second optical wireless communication device 250 from responding to a UV beam from an unfriendly source. If the IFF code is verified, the second optical wireless communication device 250 instructs the receiver 252 to transmit a downlink UV beam (not shown) in response to the uplink UV beam 230.

The downlink and uplink beam powers are controlled by the respective controllers 220 and 260 to have a minimum power level required by the airborne and underwater receivers to recover the received beams. In one embodiment, the field-of-view (FOV) of the transmitters are adjustable due to the associated optics 214 and 254. When the receiver 256 moves into the center of the coverage (CoC), which is a central point of the footprint 234, the FOV of the transmitter 212 is decreased by the controller 220, to concentrate the beam power to the receiver 256, thus offering high SNR for a higher data rate. When the receiver 256 moves away the center of the coverage, the FOV of the transmitter 212 is increased by the controller 220 to enlarge the coverage. The increased FOV will also be favorable in the presence of water waves, in case that the signal is lost due to the misalignment by the waves.

Figure 3A:
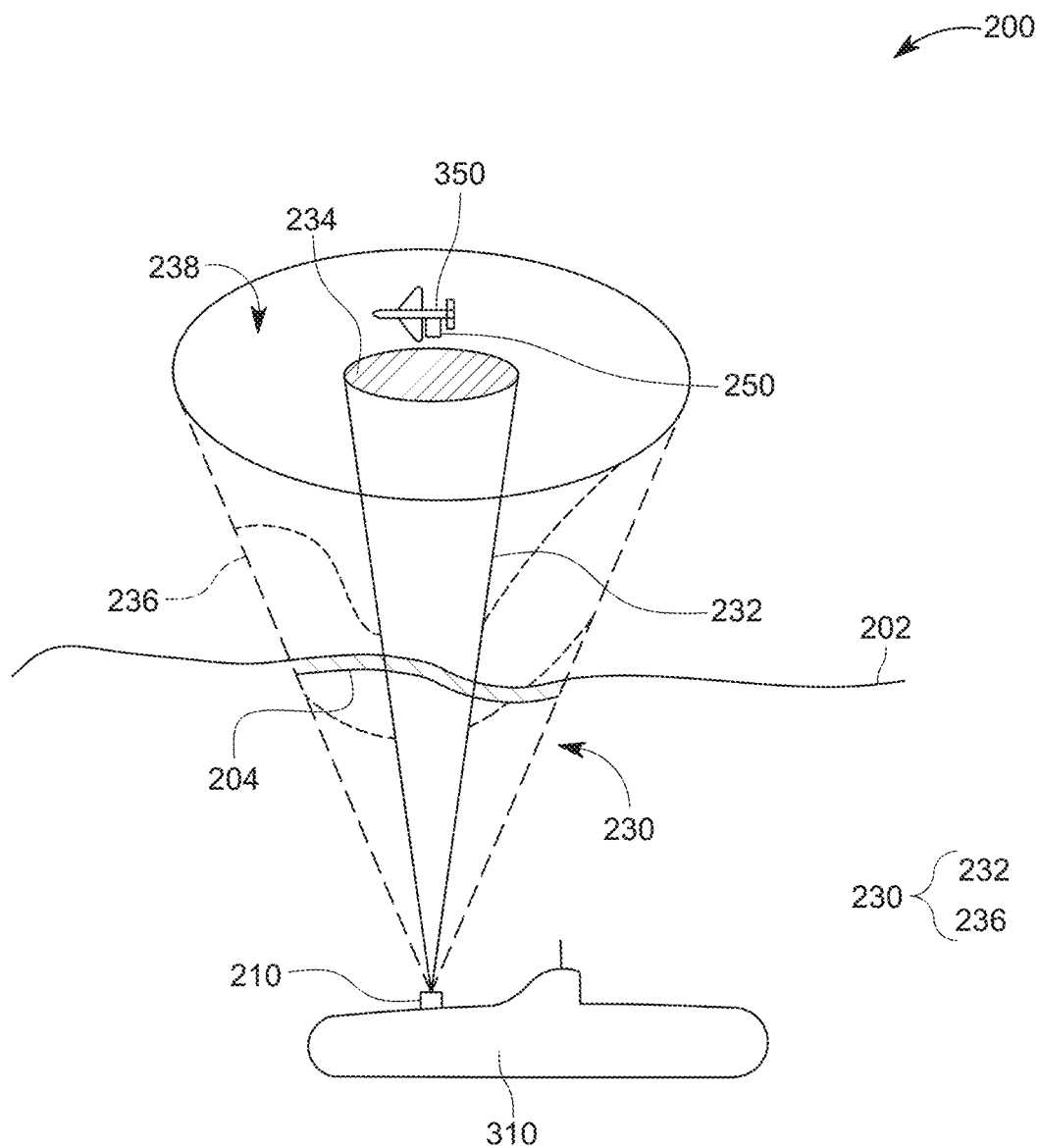
FIGS. 3A and 3B illustrate various characteristics of the optical wireless communication system when the underwater transmitter emits the light.

FIG. 3A schematically illustrates the communication uplink from the underwater platform 310, e.g. a submarine, to the airborne platform 350, e.g. a drone, the diffused UV light beam 230 (that includes both cones 232 and 236) propagating through the water-air interface 204, and forming a FOV area 234 in the air, which is determined by the projection optics 214 for the UV transmitter 212. On the other side, due to the strong scattering of the UV light (scattering coefficient $>0.007$ $m^{-1}$), an enlarged coverage area 238 is formed in the air. The enlarged coverage area 238, which is defined by the second cone 236, is determined by the transmission power of the UV transmitter 212 and the turbidity of the water and the air. The second cone 236 is typically larger than the FOV described by the first cone 232, by at least 10 times. Therefore, the total coverage area of the UV beam 230 will be the sum of the FOV described by the first cone 232 and the enlarged coverage area due to the scattering, which is described by the second cone 236. In effect, the total coverage area is described by the area 238. This enlarged coverage area is achieved because the UV light is highly scattered by the particles in the water and/or air, and this is the reason for choosing the UV light as the carrier for this type of communications.

Figure 3B:
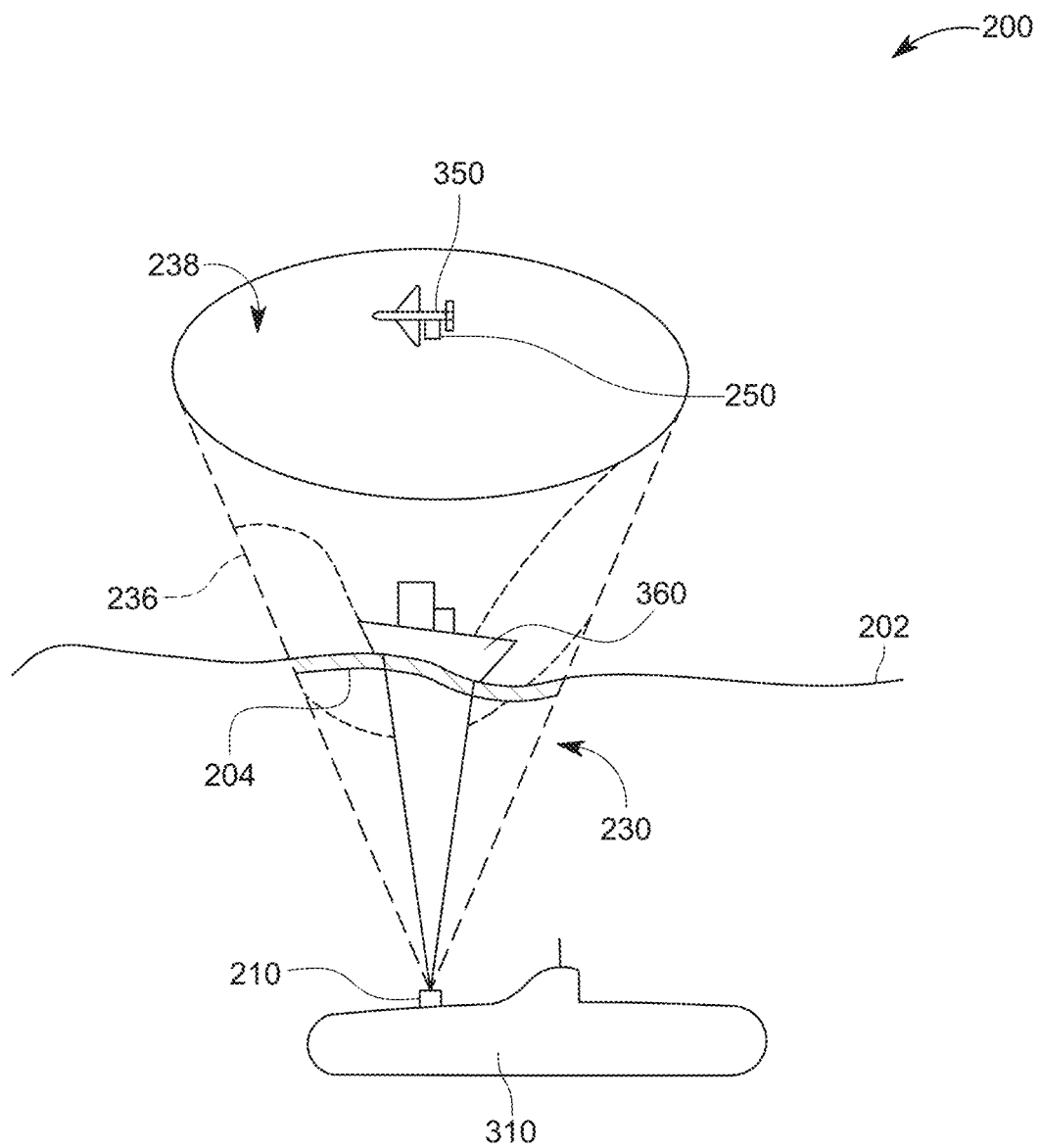

This means that the airborne platform 350 does not need to be in the FOV area 234 of the UV transmitter 212 mounted on the underwater platform 310, as long as the airborne platform is present into the enlarged coverage area 238 of the communication link. This effective communication therefore can be guaranteed even when an obstructing device 360, e.g. a boat floating on the water surface 202, is blocking the FOV 232 of the UV transmitter 212, as shown in FIG. 3B. This scattering-aided across the water-air interface 204 configuration makes the system 200 more robust in the complex ocean environment, where the water surface is not as smooth as expected by the traditional methods. However, the closer to the center of the coverage the airborne platform 350 is, the higher the power received by the receiver 256, leading to a higher SNR.

Figure 4:
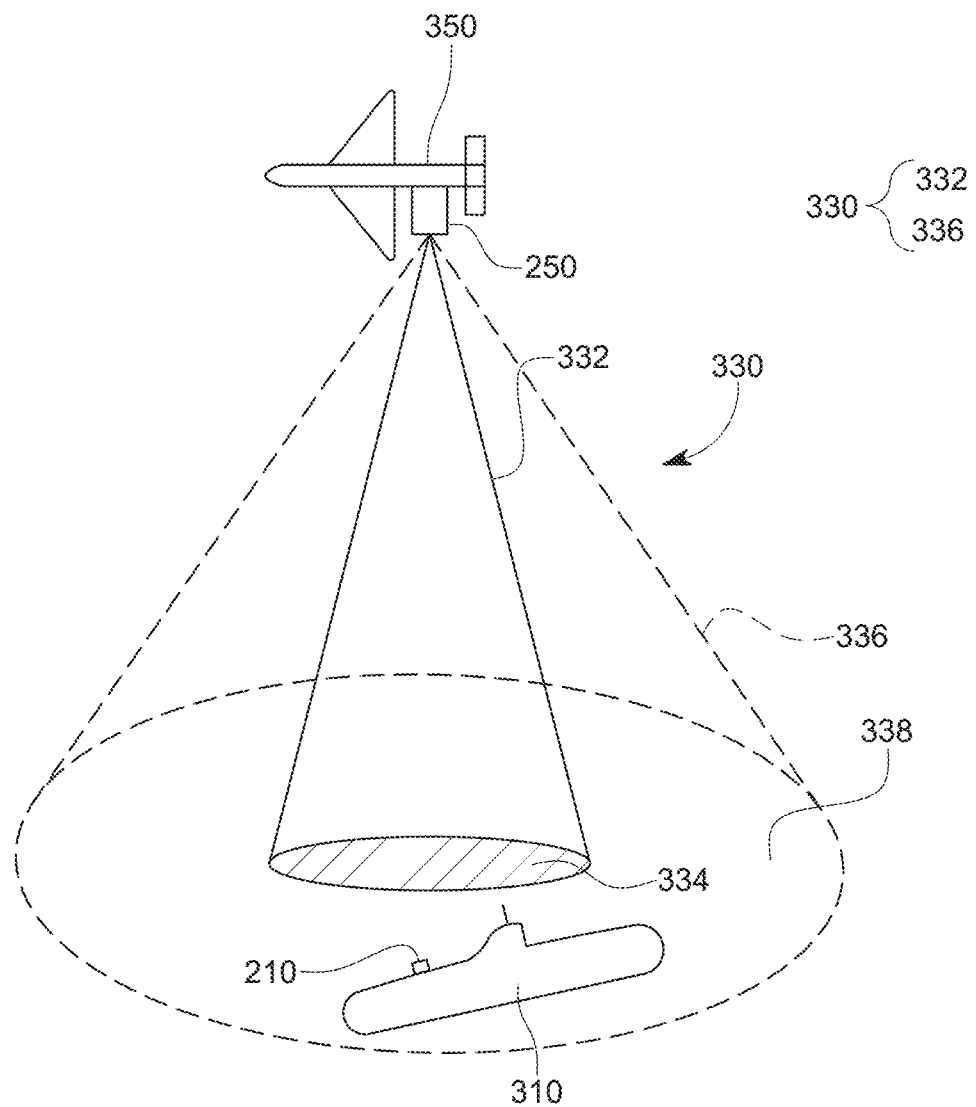
FIG. 4 illustrates a case when the above the water transmitter emits the light.

The airborne platform 350's transmitter 252 generates a communication downlink 330 as illustrated in FIG. 4, and functions in a manner similar to that of underwater transmitter 212 shown in FIG. 2. Note that the transmitter 252 generates the UV beam 330 that has a FOV defined by the first cone 332. The area where the first optical wireless communication device 210 can be located in order to establish the communication downlink 330 is 334. However, because of the nature of the UV light (i.e., high scattering), an enlarged coverage area is achieved, which is defined by the second cone 336. The total coverage area is then described by area 338, which is much larger than the traditional FOV area 334.

The uplink and downlink UV beams 230 and 330 are intentionally shown with separate paths in FIGS. 3A and 4, for clarity. However, in operation, the geometry of the transceivers (i.e., the combo including the receiver and transmitter of each optical wireless communication device) and their cones are such that the two beams substantially overlap over the same physical space for some portion of the communication period. Because the two UV beams 230 and 330 have, in one embodiment, the same optical wavelengths, the two beams may be time interleaved to avoid optical interference.

The transmitter 212/252 of each of the optical wireless communication device 210/250 includes a UV LED/laser or arrays of lasers for achieving a high power emission. In one application, a high-optical power (>10 W) UV LED arrays emitting the wavelength at UV-C/UV-B (100-280 nm/280-315 nm) are used for long-haul communications. In one embodiment, UV lens with high transparency (>70%) at UV-B/UV-C band are used for the projection optics 214/254, for eliminating the power loss at the transmitter side. In this or another embodiment, the UV receiver 216/256 may include a highly sensitivity UV photodetector (avalanche photodetector, photomultiplier tubes) that is configured to cover the wavelength ranging from 200-400 nm. The UV photodetector has a minimum sensitivity of $10^5$ NW, and the noise equivalent power (NEP) should be less than 0.15 pw/$\sqrt{Hz}$. In front of the UV detector 256/216, a very narrow UV bandpass filter 222/262 and highly transparent UV lens 218/258 are placed for collecting the optical signal and aperture averaging for mitigating the inter-symbol-interference (ISI) induced by the multipath light propagation. The controller 220/260 is connected to the receiver and transmitter (i.e., transceiver) for signal processing, controlling the optics, modulating the emitted UV beam, etc.

In one application, the location of the optics portion of the transceiver, when the first optical wireless communication system 210 is placed on a submarine, is exterior to the pressure hull, while the message processing portion is interior to the hull. This arrangement maintains the structural integrity of the submarine while allowing the desired communications between the airborne transceiver on the airborne aircraft and the underwater transceiver on the submarine. The airborne UV transmitter 252 and the airborne optical receiver 256 are both located, in one embodiment, on an outside of the body of the airborne aircraft, while the controller 260 may be located inside the body of the aircraft.

Figure 5:
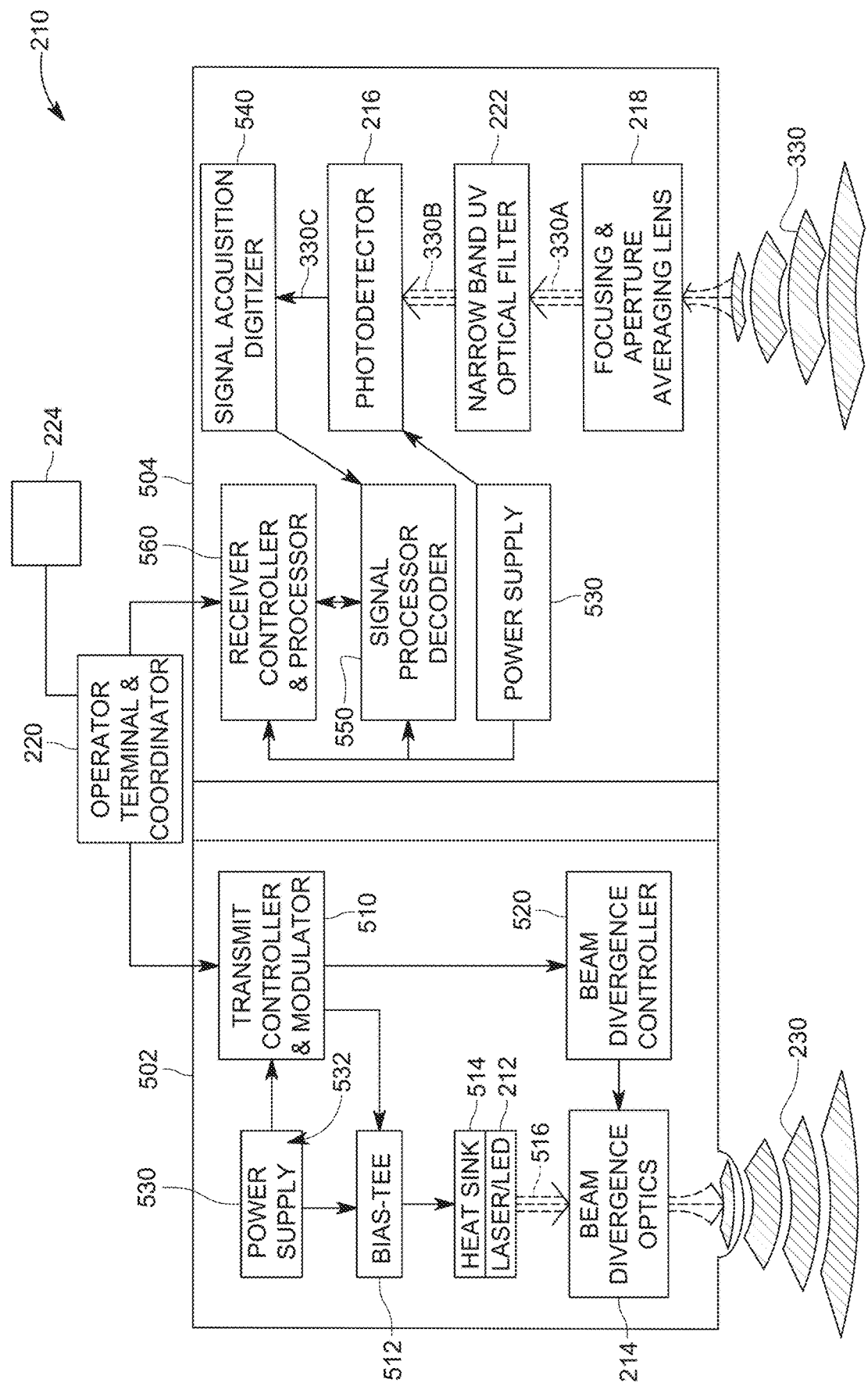
FIG. 5 illustrates the electronic configuration of the optical wireless communication system.

A more detailed view of the optical wireless communication device 210/250 is shown in FIG. 5. The first optical wireless communication device 210 shown in FIG. 5 includes a transmitter block 502 and a receiver block 504 connected to the operator terminal and coordinator 220 (also called the controller). Before the communication link is established between the first and second optical wireless communication devices 210 and 250, the pre-coded IFF and supervisory data generated by the operator terminal and coordinator 220 enters the transmitter block 502 and is fed to a transmitter controller and modulator 510, along with beam control information for setting the beam size, and power of the beam. The controller and modulator 510 sets the beam divergence, using a beam divergence controller 520. A bias-Tee 512 is used to combine the modulated information and DC power received from a power supply 530, for the UV light transmitter (laser/LED) 212.

The controller and modulator 510 is also powered by the power supply 530. A gateway circuit 532 in the power supply 530 is responsible for controlling the power distribution and switching on/off the power to the other components of the system. The combination of the DC power and modulated signal is fed to the UV transmitter 212, which in this embodiment is a laser/LED. The laser/LED 212 may have an integrated cooling system 514 for controlling the temperature of the UV transmitter. After emitted from the laser/LED 212, the UV beam 516 is diverged/converged by the beam divergence optics 214, which is controlled by the beam divergent controller 520, according to the command information from the coordinator 510. The diverged UV beam 230 is then emitted.

The receiver block 504 includes the optics 218, which is located in front of the UV receiver 216, and is used for focusing the incoming UV beam 330 and aperture averaging. Optics 218 may include one or more lenses. After passing the optics 218, the UV beam 330A passes through a very narrow band UV optical filter (FWHM<3 nm) 222 for filtering out the ambient light. The collected beam 330B is then detected by a high sensitivity UV photodetector 216, which is powered by a power supply 530. The power supply 530 may be the same power supply as in the transmitter block 502, or a different one. A signal acquisition digitizer circuit 540 is then used to convert the analog signal to a digital signal and send it to a signal processor and decoder circuit 550. The signal processor and decoder 550 is also powered by the power supply 530. A receiver controller and processor 560 communicates with the signal processor and decoder 550 and stores the received signal. The transceiver configuration for the first and second optical wireless communication devices 210 and 250 may be the same.

Figure 6:
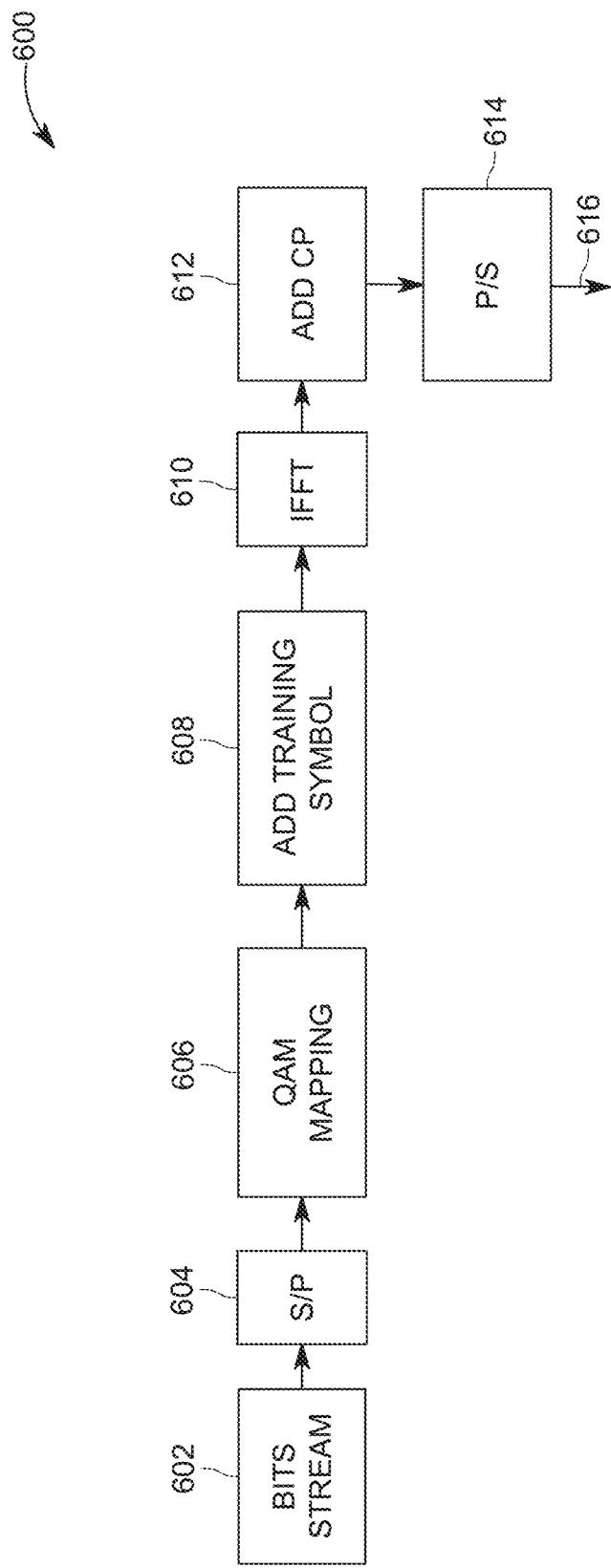
FIG. 6 illustrates the processing of the information applied to the transmitter.

FIG. 6 illustrates the block diagram of the signal processing method 600 that takes place in the transmit controller and modulator 510. The information to be transmitted is digitized to a bits stream in block 602 and then is being converted, in block 604, from series to parallel. After being encoded into QAM symbols in block 606, the binary data is assigned to different subcarriers. Each OFDM frame consist of several OFDM symbols. The preceding few OFDM symbols may be used for channel estimation and equalization. The final channel estimation is obtained by averaging all the channel estimations from every training symbol. The averaging operation could suppress some random noises and hence improve the accuracy of channel estimation. Several training symbols (TS) are further added in block 608 to the beginning of the OFDM symbols, for timing synchronization. The number of the training symbols is dependent on the real environments. The real OFDM signals are generated by using a complex conjugate extension for inverse fast Fourier transformation (IFFT) input in block 610. A frequency gap of several subcarriers is set up near the zero frequency and a cyclic prefix (CP) is added in block 612 of several samples to the OFDM signals. After parallel-to-serial (P/S) conversion and amplification in block 614, the OFDM signals 616 are generated. In one embodiment, the number of training symbols in block 608 is set to 4, the total symbols is 180 and the gap is set to 2 subcarriers.

Figure 7:
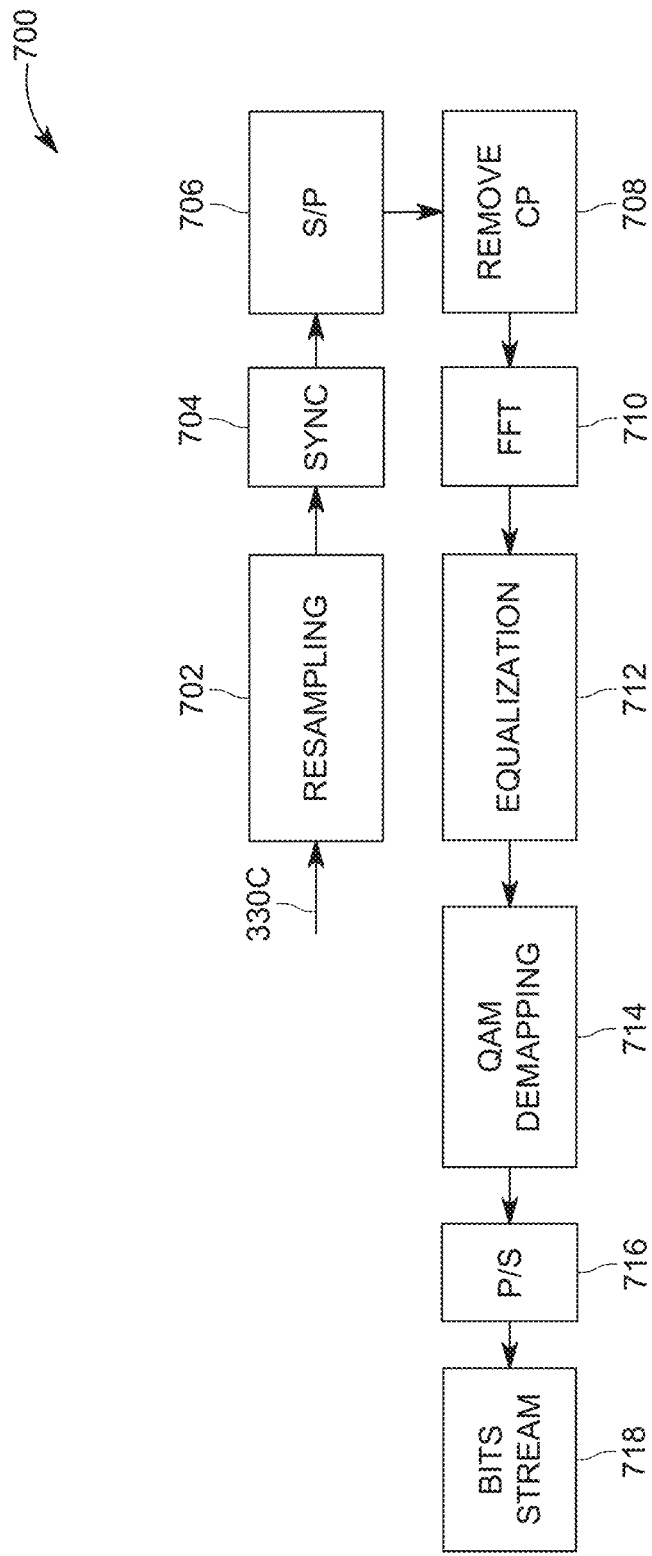
FIG. 7 illustrates the processing of the information applied to the receiver.

FIG. 7 illustrates the block diagram of the signal processing method 700 in the receiver block 504's signal processor and decoder 550. The received UV beam 330B in FIG. 5 is transformed into an electrical signal 330C at the photodetector 216, and this electrical signal goes through a similar process as that described above for the transmitter, but in an opposite direction. In other words, the electrical signal 330C is being resampling in block 702, synchronized in block 704, transformed from serial to parallel in block 706, the cyclic prefix is removed in block 708, the resultant signal is Fourier transformed in block 710, an equalization and QAM demodulation is applied in step 714, the resultant signal is parallel to series transformed in step 716, and then processed as bits stream in block 718.

Figure 8A:
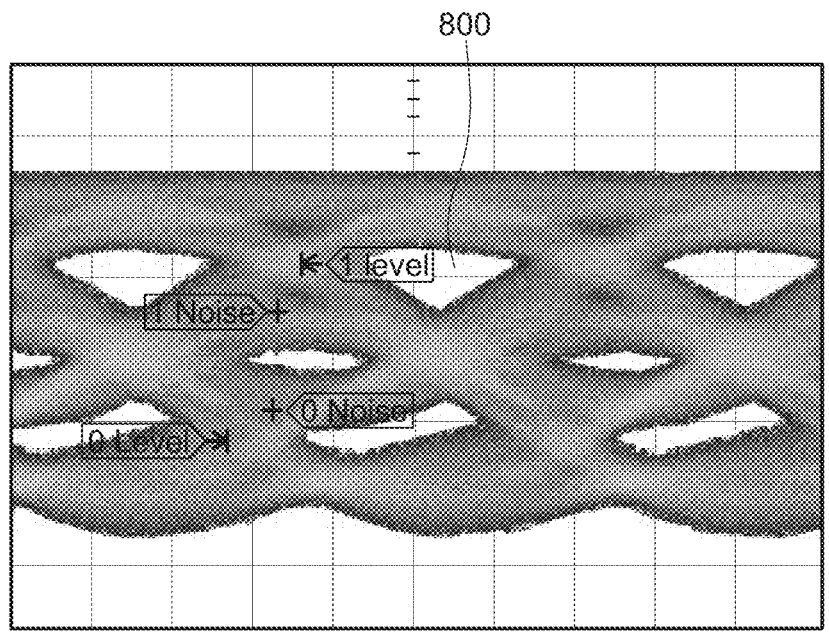
FIGS. 8A and 8B illustrate the transmission of the UV light from a first medium to a second medium and the coverage area of the UV beam.
Figure 8B:
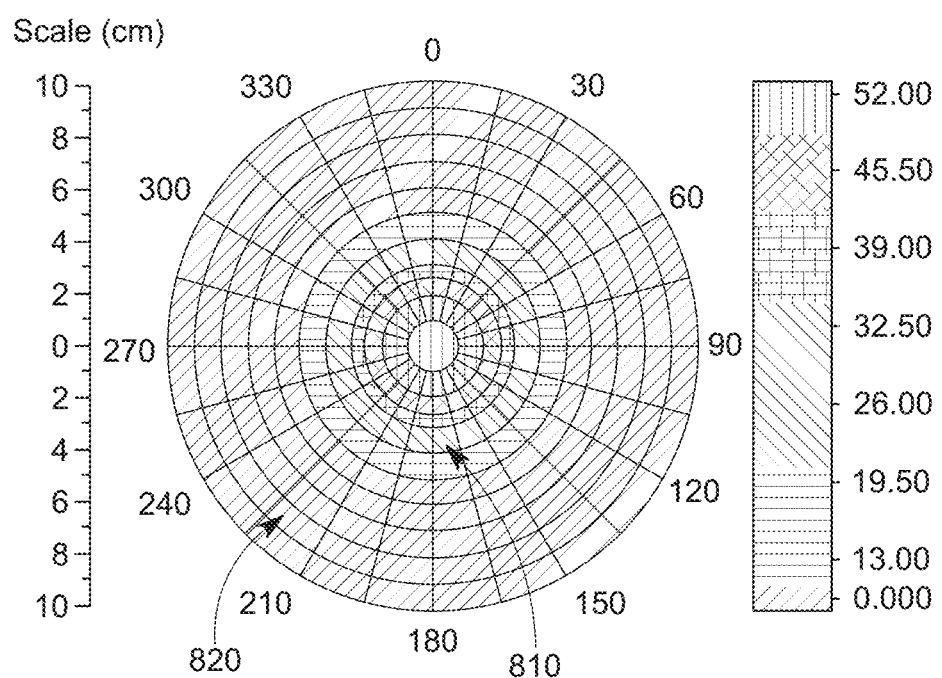

The system 200 described above has been tested with the first optical wireless communication device 210 placed in water and the second optical wireless communication device 250 placed in air, above the first optical wireless communication device 210. FIG. 8A illustrates the measured eye diagram for the data rate of 53 Mbit/s using the OOK modulation when the airborne receiver 256 is at the aligned position, i.e., within the FOV. A clear open eye 800 can be observed, confirming the establishment of a communication link. FIG. 8B illustrates, for the same experiment, the communication coverage using the OOK modulation, with 810 indicating the effective communication coverage and 820 indicating communication blind area. The bar in FIG. 8B indicates the data rate for various positions.

Figure 9A:
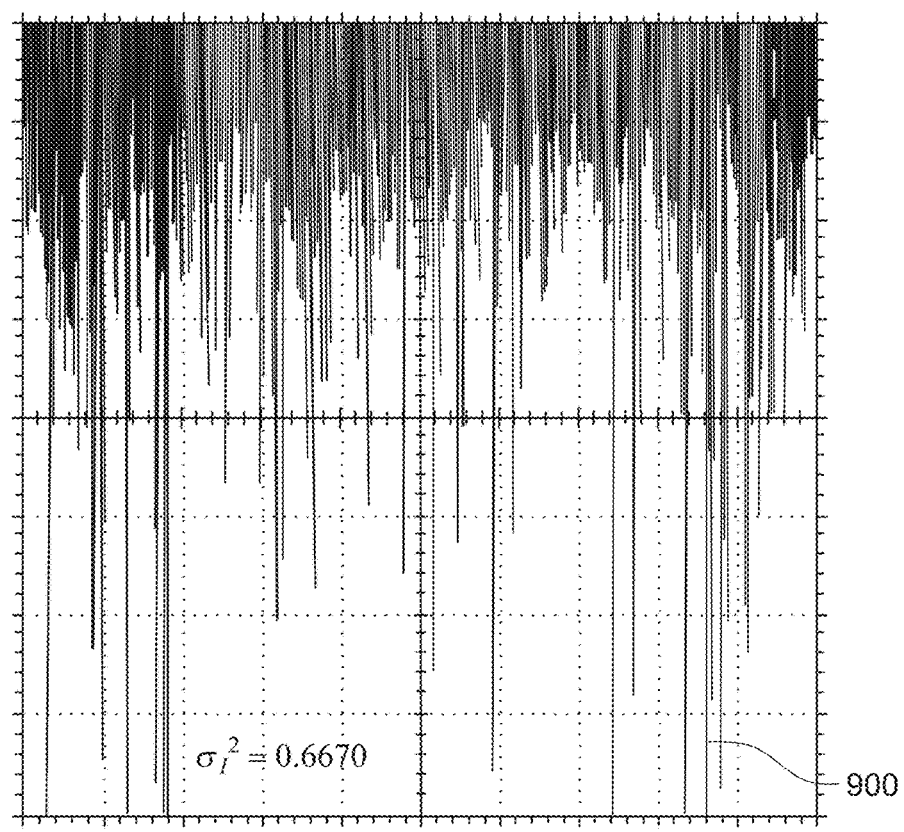
FIGS. 9A and 9B illustrate the performance parameters for the transmission of UV light from a first medium to a second medium.

FIG. 9A illustrates the measured signal fading in the presence of the water waves. An optical wave propagating through the atmosphere will experience irradiance (intensity) fluctuations, or scintillation. Scintillation is caused almost exclusively by small temperature variations in the atmosphere, resulting in index of refraction fluctuations (i.e., optical turbulence). For this reason, a scintillation index (normalized variance of irradiance fluctuations) is defined as:

$$\sigma_I^2 = \frac{\langle I^2 \rangle - \langle I \rangle^2}{\langle I \rangle^2}, \quad (1)$$

where I is the light intensity and the angle brackets denote an average value. For the present experiment, the scintillation index $\sigma_I^2$ of the received signal was determined to be about 0.667, which is in the range of moderate scintillation index ($0.1 < \sigma_I^2 < 1$). Note that FIG. 9A shows the scintillation varying and having plural peaks 900. For this experiment, the waveform of the UV beam was measured using an oscilloscope and the scintillation index was calculated using the receiver controller and signal processor 560, based on equation (1). Note that the functionality of the oscilloscope may be implemented in the controller 220/260.

Figure 9B:
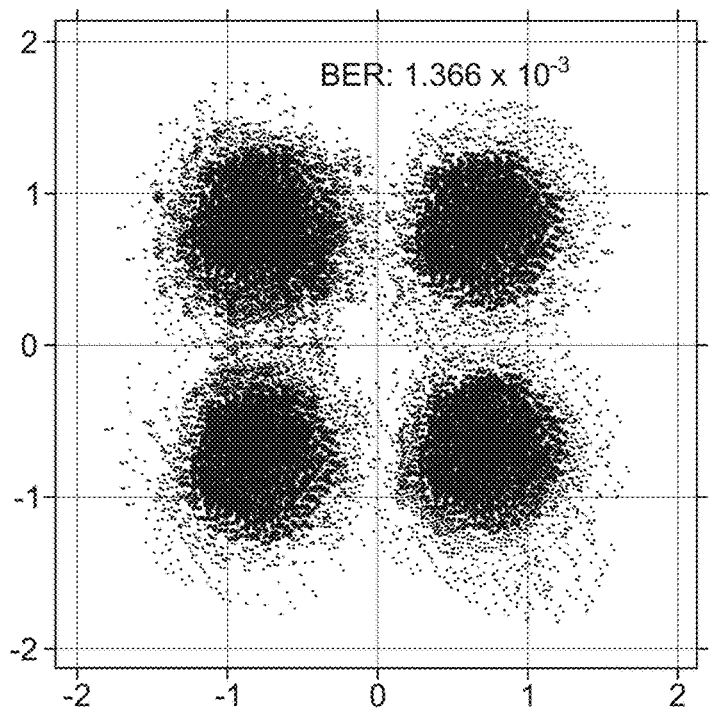

FIG. 9B illustrates the constellation for the communication system 200 at a data rate of 42 Mbit/s using OFDM technology in the presence of the waves. The bit error rate (BER) is $1.366 \times 10^{-3}$, which meets the forward error correction (FEC) standard. This suggests that the OFDM modulation is capable to mitigate the effect of the scintillation brought by the waves, ensuring a robust communication link.

In one embodiment, the controller 220 may be configured to change the modulation scheme of the communication link based on weather conditions. More specifically, if the water-air interface is smooth, i.e., no waves or small waves, as was the case for the experiment performed above, then the performance of the communication link that uses the OOK modulation scheme is very good, as shown in FIGS. 8A and 8B. However, if the weather conditions are not good, then it is expected that high waves are formed at the water-air interface, and thus, the performance of the communication link with OOK modulation may degrade below a minimum threshold. If this is the case, the controller 220 may be configured to switch the modulation scheme from OOK to OFDM based on weather conditions. Thus, according to an embodiment, a modulation scheme is selected based on the weather, i.e., the height of the water waves. As previously discussed, the height of the water waves may be measured with the wave measuring device 224/264.

Figure 10:
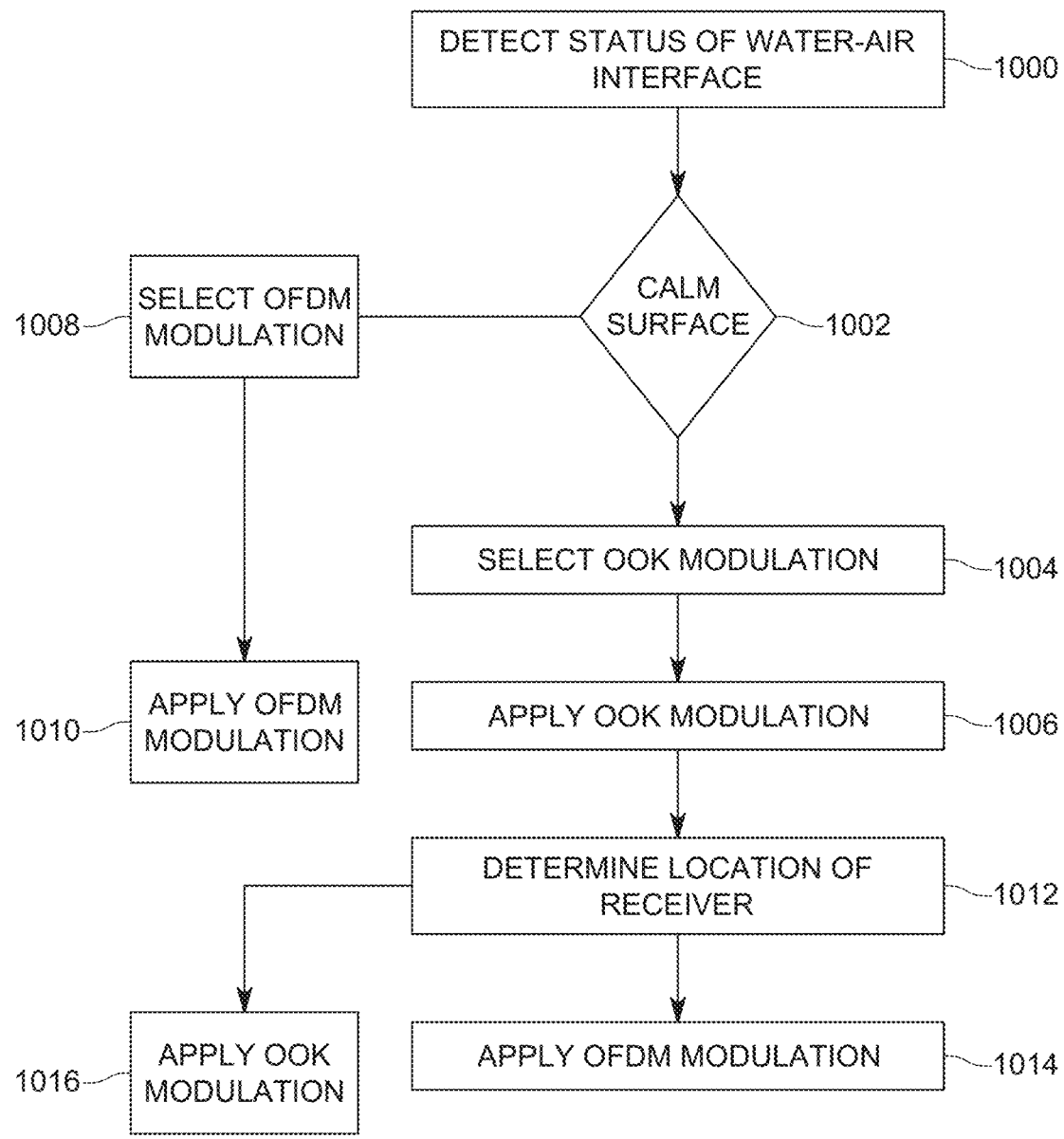
FIG. 10 is a flowchart of a method for transmitting information with UV light, from a medium to another medium.

For example, as illustrated in FIG. 10, a method for selecting the modulation scheme based on weather conditions includes a step 1000 of detecting the height of the waves at the water-air interface. In step 1002, a decision is made whether the water surface is calm or not. If the water surface is calm, i.e., small waves, the OOK modulation is selected in step 1004 and applied in step 1006 to achieve large coverage, easing the requirements on the alignment between the underwater/airborne transmitter and the airborne/underwater receiver. In case of wavy water surface, the OFDM modulation is selected in step 1008 and is applied in step 1010 to the transmitters to enhance the robustness of the communication in the presence of the waves. The height of the water waves may be measured in step 1000 with the wave measuring device discussed above.

Step 1002 evaluates weather the water surface is calm, i.e., smooth, no waves or small waves. A threshold to distinguish between calm water surface and agitated water surface may be if the height of the water waves is larger than 0.01 m. However, in another embodiment, it is possible to determine in step 1002 the value of the scintillation index and assert that the water-air interface is smooth or not. In other words, in step 1002, it is possible to measure the light intensity I and then calculate the scintillation index based on equation (1). If the scintillation index is smaller than 1 (other values may be used, this is just an exemplary value), then the OOK modulation is selected in step 1004. However, if the scintillation index is smaller than 0.1, then the OFDM modulation is selected in step 1008.

In one modification of this embodiment, the modulation scheme selection of FIG. 10 is also determined by the location of the receiver. For example, when the receiver is determined in step 1012 to be close to the aligned position (CoC), where the SNR is high (>5 dB), the OFDM modulation is selected in step 1014, even if the water surface is calm, to improve the data rate due to its high spectrum efficiency. However, when the receiver is far away from the aligned position, i.e., the SNR is low (<5 dB), the OOK is selected in step 1016, to enable effective communication. The position of the receiver can be evaluated in step 1012 by calculating the SNR intensity due to the received power. Note that although FIG. 10 shows the steps 1012, 1014, and 1016 being performed following step 1006, in one application, steps 1012, 1014, and 1016 can be performed independent of the weather conditions, i.e., exclusively based only on the location of the receiver, and independent of the previous steps.

Figure 11:
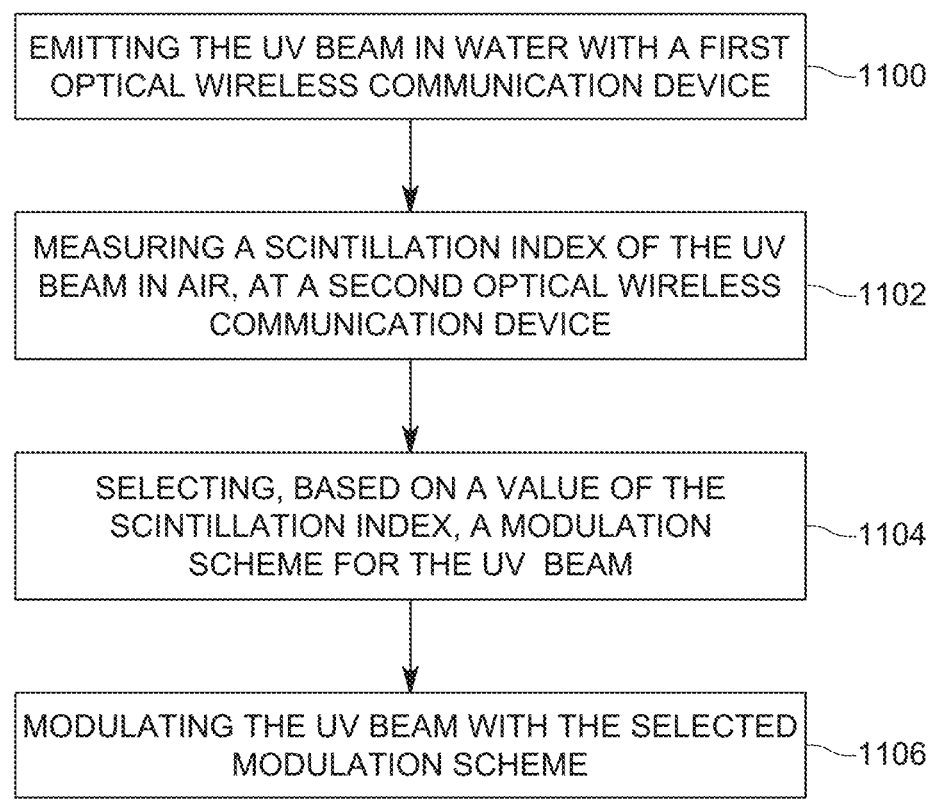
FIG. 11 is a flowchart of a method for transmitting information with UV light, in which a modulation scheme is selected based on a scintillation index.

A method for transmitting information across a water-air interface with a ultraviolet UV beam is now discussed with regard to FIG. 11. The method includes a step 1100 of emitting the UV beam 230 in water, with a first optical wireless communication device 210, a step 1102 of measuring a scintillation index of the UV beam 230 in air, with a second optical wireless communication device 250, a step 1104 of selecting, based on a value of the scintillation index, a modulation scheme for the UV beam 230, and a step 1106 of modulating the UV beam 230 with the selected modulation scheme. The UV beam has a wavelength in a range of 100 to 400 nm.

The modulation scheme is one of a on-off-keying (OOK) and an orthogonal-frequency division multiplexing (OFDM). The method may also include a step of embedding a predetermined identification code into the UV beam, and/or a step of responding to the first optical wireless communication device with a value of the measured scintillation index, only if the second optical wireless communication device determines that the predetermined identification corresponds to a friend. The first optical wireless communication device selects the modulation scheme based on the received scintillation index.

The method may further include a step of determining a height of a water wave at the water-air interface, and a step of selecting a first modulation scheme if the height of the water wave is larger than a predetermined threshold, and selecting a second modulation scheme is the height of the water wave is smaller than the predetermined threshold. The first optical wireless communication device is attached to a submarine, and the second optical wireless communication device is attached to an aircraft. No acoustic signal is used in this method. Thus, the UV beam propagates through water, the water-air interface and then air, between the first and second optical wireless communication devices.

Figure 12:
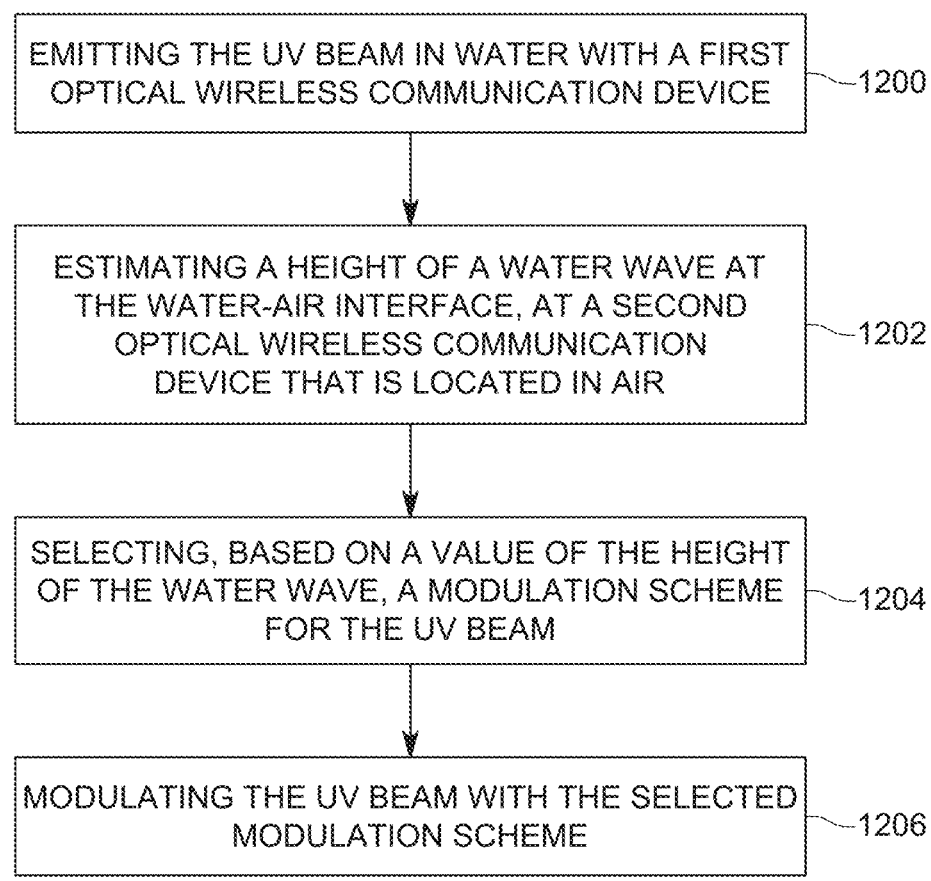
FIG. 12 is a flowchart of a method for transmitting information with UV light, in which a modulation scheme is selected based on a height of the water waves at the water-air interface.

According to another embodiment, as illustrated in FIG. 12, there is a method for transmitting information across a water-air interface with a ultraviolet (UV) beam 230. The method includes a step 1200 of emitting the UV beam 230 in water, with a first optical wireless communication device 210, a step 1202 of estimating a height of a water wave at the water-air interface, with a second optical wireless communication device 250 that is located in air, a step 1204 of selecting, based on a value of the height of the water wave, a modulation scheme for the UV beam 230, and a step 1206 of modulating the UV beam 230 with the selected modulation scheme, where the UV beam has a wavelength in a range of 100 to 400 nm.

The modulation scheme is one of a on-off-keying (OOK) and an orthogonal-frequency division multiplexing (OFDM). The method may further include a step of embedding a predetermined identification code into the UV beam, and/or a step of responding to the first optical wireless communication device with a value of the estimated height of the water wave, only if the second optical wireless communication device determines that the predetermined identification corresponds to a friend. The first optical wireless communication device selects the modulation scheme based on the received height of the water wave.

The method may further include a step of measuring a scintillation index of the UV beam 230 in air, at the second optical wireless communication device 250, and a step of selecting a first modulation scheme if a value of the scintillation index is larger than a given threshold, and selecting a second modulation scheme if the value of the scintillation index is smaller than the given threshold. The first optical wireless communication device is attached to a submarine, and the second optical wireless communication device is attached to an aircraft. No acoustic signal is used. The UV beam propagates through water, the water-air interface and then air, between the first and second optical wireless communication devices.

The system discussed in the previous embodiments provides a robust, large coverage, high-data rate, bi-directional optical wireless communications between a submerged platform in water and an airborne platform travelling in air. The methods discussed above improve the surfacing, security, and user mobility concerns as well as achieving a high-data rate across the water-air interface for communications using a single type of carrier. In one embodiment, the system provides a large signal detection area due to the high-scattering of the UV light, which eases the requirements for alignment between the transmitter and receiver.

Figure 13:
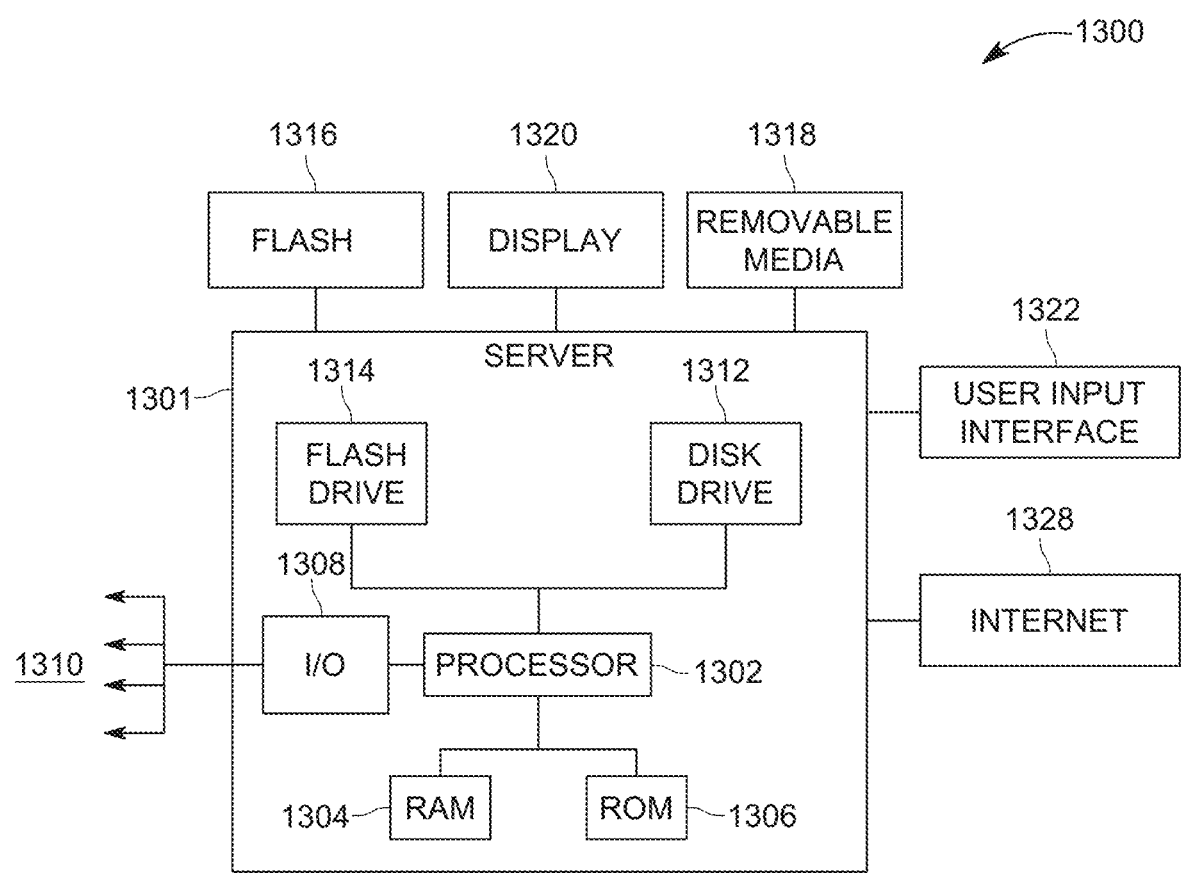
FIG. 13 is a schematic diagram of a computing device that implements the novel methods discussed herein.

The above-discussed procedures and methods may be implemented in the controller 220 or 260 or both. These controllers may be a computing device as illustrated in FIG. 13. Hardware, firmware, software or a combination thereof may be used to perform the various steps and operations described herein.

Computing device 1300 suitable for performing the activities described in the embodiments discussed above may include a server 1301. Such a server 1301 may include a central processor (CPU) 1302 coupled to a random access memory (RAM) 1304 and to a read-only memory (ROM) 1306. ROM 1306 may also be other types of storage media to store programs, such as programmable ROM (PROM), erasable PROM (EPROM), etc. Processor 1302 may communicate with other internal and external components through input/output (I/O) circuitry 1308 and bussing 1310 to provide control signals and the like. Processor 1302 carries out a variety of functions as are known in the art, as dictated by software and/or firmware instructions.

Server 1301 may also include one or more data storage devices, including hard drives 1312, flash memory 1314 and other hardware capable of reading and/or storing information, such as DVD, etc. In one embodiment, software for carrying out the above-discussed steps may be stored and distributed on a flash memory 1316, a USB storage device 1318 or other form of media capable of portably storing information. These storage media may be inserted into, and read by, devices such as flash memory drive 1314, disk drive 1312, etc. Server 1301 may be coupled to a display 1320, which may be any type of known display or presentation screen, such as LCD, plasma display, cathode ray tube (CRT), etc. A user input interface 1322 is provided, including one or more user interface mechanisms such as a mouse, keyboard, microphone, touchpad, touch screen, voice-recognition system, etc.

Server 1301 may be coupled to other devices, such as wave measuring devices, detectors, sensors, etc. The server may be part of a larger network configuration as in a global area network (GAN) such as the Internet 1328, which allows ultimate connection to various landline and/or mobile computing devices.

The disclosed embodiments provide a method and system that uses a single type of carrier for transmitting information across a water-air interface. The embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] N. E. Farr, L. Freitag, J. Preisig, D. R. Yoerger, S. N. White, and A. D. Chave, "Systems and methods for underwater optical communication," (Google Patents, 2011).
[2]. J. Soderberg, "Free space optics in the Czech wireless community: shedding some light on the role of normativity for user-initiated innovations," Science, Technology, & Human Values 36, 423-450 (2011).
[3] P. J. Titterton, F. Martin, D. J. Radecki, and R. W. Cotterman, "Secure two-way submarine communication system," (Google Patents, 1991).
[4] X. Sun, Z. Zhang, A. Chaaban, T. K. Ng, C. Shen, R. Chen, J. Yan, H. Sun, X. Li, J. Wang, J. Li, M.-S. Alouini, and B. S. Ooi, "71-Mbit/s ultraviolet-B LED communication link based on 8-QAM-OFDM modulation," Opt. Express 25, 23267-23274 (2017).
[5] M. Geller, T. E. Keenan, D. E. Altman, and R. H. Patterson, "Optical non-line-of-sight covert, secure high data communication system," (Google Patents, 1985).
[6] X. Sun, W. Cai, O. Alkhazragi, E.-N. Ooi, H. He, A. Chaaban, C. Shen, H. M. Oubei, M. Z. M. Khan, T. K. Ng, M.-S. Alouini, and B. S. Ooi, "375-nm ultraviolet-laser based non-line-of-sight underwater optical communication," Opt. Express 26, 12870-12877 (2018).

What is claimed is:
1. A method for transmitting information across a water-air interface with a ultraviolet (UV) beam, the method comprising:
   emitting the UV beam in a first, free medium, with a first optical wireless communication device;
   measuring a scintillation index of the UV beam in a second, free medium, different from the first, free medium, at a second optical wireless communication device, wherein the scintillation index is an indicator of weather conditions at the water-air interface;
   selecting, based on the weather conditions and a value of the scintillation index, a modulation scheme for the UV beam; and
   modulating the UV beam with the selected modulation scheme,
   wherein the UV beam has a wavelength in a range of 100 to 400 nm.

2. The method of claim 1, wherein the modulation scheme is one of a on-off-keying (OOK) and orthogonal-frequency division multiplexing (OFDM).

3. The method of claim 1, further comprising:
embedding a predetermined identification code into the UV beam.

4. The method of claim 3, further comprising:
responding to the first optical wireless communication device with a value of the measured scintillation index only if the second optical wireless communication device determines that the predetermined identification is known.

5. The method of claim 4, wherein the first optical wireless communication device selects the modulation scheme based on the received scintillation index.

6. The method of claim 1, further comprising:
determining a height of a water wave at the water-air interface; and
selecting a first modulation scheme if the height of the water wave is larger than a predetermined threshold, and selecting a second modulation scheme if the height of the water wave is smaller than the predetermined threshold,
wherein the first medium is air or water and the second medium is water or air, respectively.

7. The method of claim 1, wherein the first optical wireless communication device is attached to a submarine, or sensor probe, or remote operated vehicle, or a diver, and the second optical wireless communication device is attached to an aircraft or unmanned aerial vehicle.

8. The method of claim 1, wherein no acoustic signal is used.

9. The method of claim 1, wherein the UV beam propagates through water, the water-air interface and then air, between the first and second optical wireless communication devices.

10. A method for transmitting information across a water-air interface with a ultraviolet (UV) beam, the method comprising:
emitting the UV beam in a first, free medium, with a first optical wireless communication device;
estimating a height of a water wave at the water-air interface, with a second optical wireless communication device that is located in a second, free medium, different from the first, free medium;
selecting, based on a value of the height of the water wave, a modulation scheme for the UV beam; and
modulating the UV beam with the selected modulation scheme,
wherein the UV beam has a wavelength in a range of 100 to 400 nm, and
wherein the first medium is air or water and the second medium is water or air, respectively.

11. The method of claim 10, wherein the modulation scheme is one of an on-off-keying (OOK) and an orthogonal-frequency division multiplexing (OFDM).

12. The method of claim 10, further comprising:
embedding a predetermined identification code into the UV beam.

13. The method of claim 12 further comprising:
responding to the first optical wireless communication device with a value of the estimated height of the water wave only if the second optical wireless communication device determines that the predetermined identification is known.

14. The method of claim 13, wherein the first optical wireless communication device selects the modulation scheme based on the received height of the water wave.

15. The method of claim 10, further comprising:
measuring a scintillation index of the UV beam in air, at the second optical wireless communication device; and
selecting a first modulation scheme if a value of the scintillation index is larger a given threshold, and selecting a second modulation scheme if the value of the scintillation index is smaller than the given threshold.

16. The method of claim 10, wherein the first optical wireless communication device is attached to a submarine, and the second optical wireless communication device is attached to an aircraft.

17. The method of claim 10, wherein no acoustic signal is used.

18. The method of claim 10, wherein the UV beam propagates through water, the water-air interface and then air, between the first and second optical wireless communication devices.

19. A system for transmitting information across a water-air interface with a ultraviolet (UV) beam, the system comprising:
a first optical wireless communication device configured to emit in water the UV beam;
a second optical wireless communication device configured to measure a parameter; and
a controller that is configured to select, based on a value of the measured parameter, a modulation scheme for the UV beam,
wherein the first optical wireless communication device modulates the UV beam with the selected modulation scheme, and
wherein the UV beam has a wavelength in a range of 100 to 400 nm, and
wherein the parameter is a scintillation index associated with weather conditions at the water-air interface, or a height of water waves at the water-air interface.

* * * * *